(No Model.)

A. P. JERGUSON & W. W. HUNT.
FLEXIBLE PIPE JOINT.

No. 570,405. Patented Oct. 27, 1896.

WITNESSES:
Henry A. C. Hillyer.
Rev. G. Hosher.

INVENTORS
A. P. Jerguson
W. W. Hunt
BY
ATTORNEYS.

UNITED STATES PATENT OFFICE.

ANDREW P. JERGUSON AND WILLIAM W. HUNT, OF HULL, FLORIDA.

FLEXIBLE PIPE-JOINT.

SPECIFICATION forming part of Letters Patent No. 570,405, dated October 27, 1896.

Application filed April 18, 1896. Serial No. 588,126. (No model.)

*To all whom it may concern:*

Be it known that we, ANDREW P. JERGUSON and WILLIAM W. HUNT, of Hull, in the county of De Soto and State of Florida, have invented a new and Improved Flexible Pipe-Joint, of which the following is a full, clear, and exact description.

The object of the invention is to provide a new and improved flexible pipe-joint which is simple and durable in construction and more especially designed for use on suction-pipes for sand-pumps and other machines.

The invention consists principally of a double ball-joint in the end sections connected with the hose.

The invention also consists of certain parts and details and combinations of the same, as will be fully described hereinafter, and then pointed out in the claim.

Reference is to be had to the accompanying drawings, forming a part of this specification, in which similar characters of reference indicate corresponding parts in all the figures.

Figure 1:
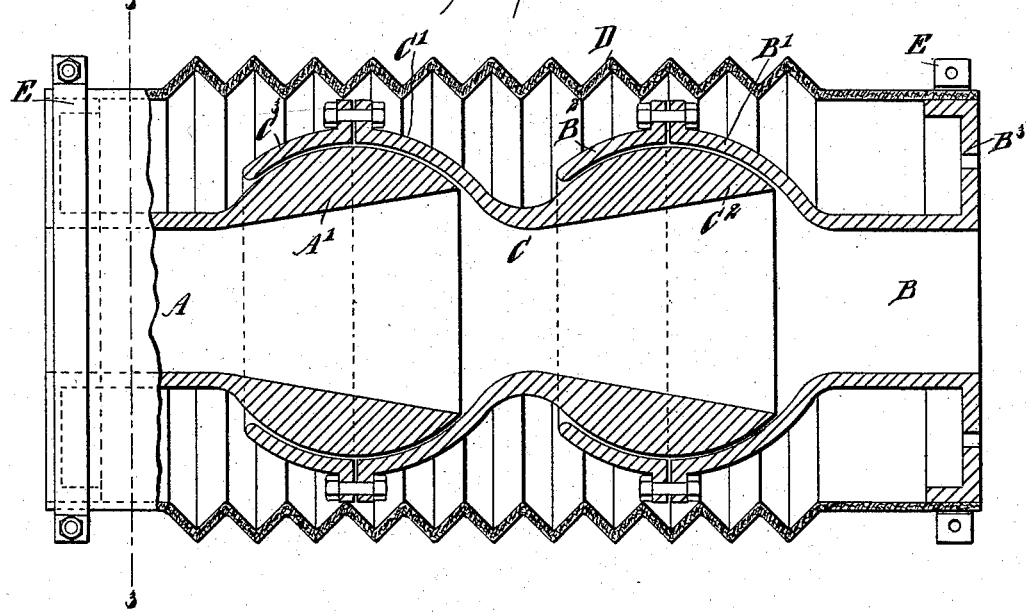
Figure 2:
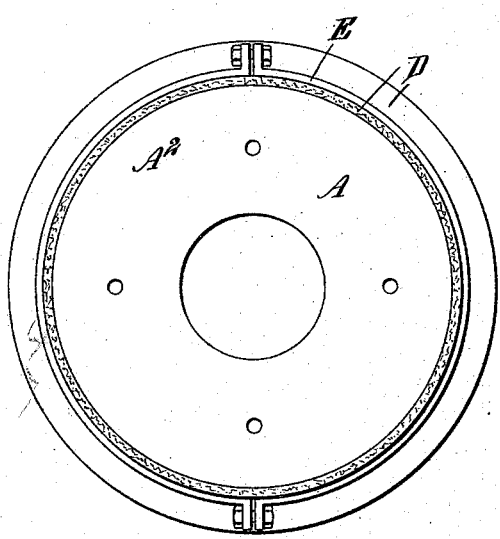
Figure 3:
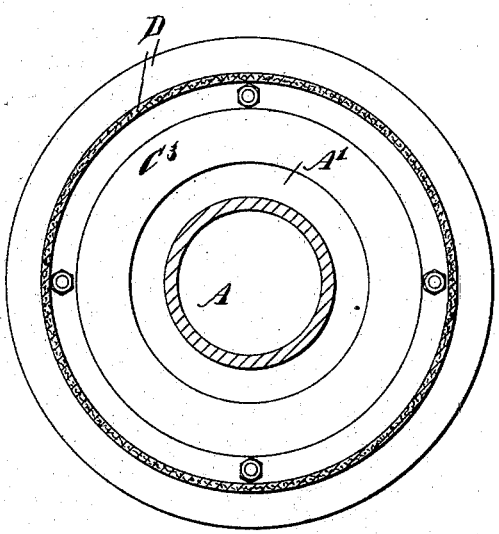

Figure 1 is a longitudinal section of the improvement. Fig. 2 is an end elevation of the same, and Fig. 3 is a transverse section of the same on the line 3 3 of Fig. 1.

The improved flexible pipe-joint is provided with the end sections A B, having central bores and adapted to be connected with the ends of the hose. The two sections A and B are connected with each other by a central section C, formed at one end into a spherical shell C', engaging a ball A', formed on the inner end of the section A, and the other end of the central section C is formed with a ball $C^2$, engaged on its external surface by a spherical shell B', formed on the inner end of the section B. The bores in the balls A' and $C^2$ are preferably made tapering or flaring, as plainly indicated in Fig. 1, so that a full opening is always maintained in case the pipe is bent so that the sections A and B stand at angles one to the other and to the central section C.

The spherical shells C' and B' are preferably made in two parts, one of which is integral with the section A or B, respectively, and the other parts $C^3$ and $B^2$, respectively, are bolted or otherwise fastened to the integral parts, respectively. By this arrangement the section C can be readily placed in position, so that its ball $C^2$ is engaged by the spherical shell B' and its spherical shell C' readily engages the ball A'.

In order to prevent leakage between the sections, we provide a flexible corrugated tubing D, fastened at its ends to flanges $A^2$ and $B^3$, arranged on the outer ends of the sections A and B, so that the entire joint between the said flanges is inclosed within the tubing D, and consequently any fluid passing through the joint cannot leak out, owing to the tubing inclosing the entire joint. The ends of the tubing D are secured to the flanges $A^2$ and $B^3$ by suitable clamps E, as is plainly shown in Figs. 1 and 2.

By the arrangement described the double ball-joint permits of readily bending the suction-hose or other device on which the joint is applied, and at the same time provides a full-sized bore through the joint for the ready passage of water, sand, or other fluid or substance.

Having thus fully described our invention, we claim as new and desire to secure by Letters Patent—

A flexible joint for a pipe, comprising an end section having a spherical inner end, a tubular section having a ball-shaped end to engage in said spherical end of the end section and having a spherical end, another end section having a ball-shaped end to engage in the spherical portion of the central section, the said end sections on their outer ends being provided with annular flanges, and a tubing of flexible material having its ends connected to said flanges, substantially as specified.

ANDREW P. JERGUSON.
WILLIAM W. HUNT.

Witnesses:
S. LLOYD DRANE,
O. C. BOURNE.